(12) United States Patent
Lee et al.

(10) Patent No.: US 7,938,951 B2
(45) Date of Patent: May 10, 2011

(54) METHODS AND SYSTEMS FOR FORMING TAPERED COOLING HOLES

(75) Inventors: Ching-Pang Lee, Cincinnati, OH (US); Bin Wei, Mechanicville, NY (US); Chen-Yu Jack Chou, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1083 days.

(21) Appl. No.: 11/726,410

(22) Filed: Mar. 22, 2007

(65) Prior Publication Data

US 2008/0230378 A1    Sep. 25, 2008

(51) Int. Cl.
*B23H 9/14*    (2006.01)
*B23H 3/04*    (2006.01)

(52) U.S. Cl. .................. 205/665; 204/224 M; 204/280

(58) Field of Classification Search .................. 205/665; 204/280, 224 M
See application file for complete search history.

(56) References Cited

U.S. PATENT DOCUMENTS

| | | | |
|---|---|---|---|
| 3,803,018 A | 4/1974 | Andrews | |
| 4,250,011 A | 2/1981 | Capello et al. | |
| 4,690,737 A | 9/1987 | Vishnitsky | |
| 5,306,401 A | 4/1994 | Fierkens et al. | |
| 5,413,463 A | 5/1995 | Chiu et al. | |
| 5,416,289 A | 5/1995 | Tanaka | |
| 5,739,497 A | 4/1998 | Tanaka | |
| 5,820,744 A | 10/1998 | Edwards et al. | |
| 6,267,868 B1 | 7/2001 | Wei et al. | |
| 6,303,193 B1 | 10/2001 | Guida et al. | |
| 6,340,284 B1 | 1/2002 | Beeck et al. | |
| 6,413,407 B1 | 7/2002 | Bruns et al. | |
| 6,539,627 B2 | 4/2003 | Fleck | |
| 6,554,571 B1 | 4/2003 | Lee et al. | |
| 6,582,584 B2 | 6/2003 | Lee et al. | |
| 6,743,350 B2 | 6/2004 | Lee et al. | |
| 6,824,360 B2 | 11/2004 | Fleck | |
| 6,910,864 B2 | 6/2005 | Tomberg | |
| 6,994,514 B2 | 2/2006 | Soechting et al. | |
| 6,997,675 B2 | 2/2006 | Dube et al. | |
| 6,997,679 B2 | 2/2006 | Beddard et al. | |

OTHER PUBLICATIONS

U.S. Appl. No. 11/726,418, filed Mar. 22, 2007 with first-named inventor Ching-Pang Lee.

*Primary Examiner* — Alexa D. Neckel
*Assistant Examiner* — Nicholas A. Smith
(74) *Attorney, Agent, or Firm* — Armstrong Teasdale LLP

(57) ABSTRACT

A method for forming holes in an object is provided. The method includes providing an electrochemical machining (ECM) electrode including a first section having insulation that circumscribes the first section, and a second section having insulation that extends only partially around the second section. The method also includes inserting the electrode into the object, such that in a single pass the electrode forms a hole that includes a first portion having a first cross-sectional area and a second portion having a second cross-sectional area.

20 Claims, 3 Drawing Sheets

METHODS AND SYSTEMS FOR FORMING TAPERED COOLING HOLES

BACKGROUND OF THE INVENTION

This invention relates generally to electrochemical machining (ECM), and more specifically, to methods and systems for forming cooling holes in a turbine engine airfoil.

Electrochemical machining (ECM) and/or shaped tube electrochemical machining (STEM) is commonly used to form cooling holes in turbine engine airfoils. During an ECM process, the workpiece being machined is coupled to a positive terminal of a DC power supply and the electrode is coupled to a negative terminal of the DC power supply. An electrolyte flows between the electrode and the workpiece. For example, the electrolyte may be an acid or an aqueous salt solution. During the machining process, the workpiece is dissolved by controlled electrochemical reactions to form the cooling hole. Generally, such machining processes form cooling holes that have a circular cross-sectional area. The circular cross-sectional area is sized to provide a desired amount of flow metering through an inlet of the cooling hole, however, the circular cross-sectional area often reduces an amount of potential heat transfer inside the blade and/or downstream of the cooling hole, thereby reducing an amount of cooling within the blade. Further, a circular cross-sectional area defined at an outlet of the cooling hole generally may not be suitable for an airfoil having a narrow trailing edge. Moreover, a circular cross-sectional area defined at an outlet of the cooling hole may induce high stress concentrations in an area of the airfoil surrounding the cooling hole.

Accordingly, at least some known cooling holes are designed with an inlet having a circular cross-sectional area and an outlet having an elliptical cross-sectional area. Generally such cooling holes are formed via an electrochemical machining process. Although such cooling holes have the benefits of both a circular cross-sectional area and an elliptical cross-sectional area, such cooling holes also include an expansion area defined between the circular and the elliptical cross-sectional areas. As such, airflow within the expansion may experience an abrupt flow change and become disrupted and substantially non-uniform. Moreover, fabrication of such cooling holes is generally more expensive and time consuming than fabrication of other cooling holes, as known machining methods require at least two passes of an electrode to form the cooling hole.

BRIEF DESCRIPTION OF THE INVENTION

In one embodiment, a method for forming holes in an object is provided. The method includes providing an electrochemical machining (ECM) electrode including a first section having insulation that circumscribes the first section, and a second section having insulation that extends only partially around the second section. The method also includes inserting the electrode into the object, such that in a single pass the electrode forms a hole that includes a first portion having a first cross-sectional area and a second portion having a second cross-sectional area.

In another embodiment, an electrochemical machining (ECM) electrode is provided. The electrode includes a first section including insulation circumscribing the first section and a second section including insulation extending only partially around the second section. The electrode is configured to form a hole in a single pass through an object, wherein the hole includes a first portion having a first cross-sectional area and a second portion having a second cross-sectional area.

In yet another embodiment, a system for machining holes in a turbine engine component is provided. The said system includes an electrochemical machining (ECM) electrode including a first section including insulation circumscribing the first section and a second section including insulation extending only partially around the second section. The electrode is configured to form a hole in a single pass through the component, wherein the hole includes a first portion having a first cross-sectional area and a second portion having a second cross-sectional area.

DETAILED DESCRIPTION OF THE INVENTION

The present invention provides a system that may be used to machine cooling holes in a turbine engine airfoil. The system uses a hollow electrochemical machining (ECM) electrode that has electrolyte flowing therethrough. For example, the electrolyte may be an acid or an aqueous salt solution. Prior to the machining process, the airfoil is coupled to a positive terminal of a DC power supply and the electrode is coupled to a negative terminal of the DC power supply. As the electrolyte flows between the electrode and the airfoil, the airfoil is dissolved by controlled electrochemical reactions to form the cooling hole.

The electrode forms a cooling hole in the turbine engine airfoil that includes a first portion defined by a first cross-sectional area and a second portion defined by a second cross-sectional area. In the exemplary embodiment, the first portion has a substantially circular cross-sectional area and the second portion has a substantially elliptical cross-sectional area. Moreover, in the exemplary embodiment, the first portion of the cooling hole is defined in an internal surface of the airfoil and the second portion of the cooling hole is defined in an external surface of the airfoil.

Although, the present invention is described in terms of forming a cooling hole in a turbine airfoil, as will be appreciated by one skilled in the art, the present invention may also be applicable to forming cooling holes in other components of an engine and/or components of any other system that may require cooling holes, for example, but not limited to, a turbine casing and exhaust pipes and ducts. Further, although the present invention is described in terms of electrochemical machining, as will be appreciated by one skilled in the art, the present invention may also be applicable to other methods of forming apertures.

Figure 1:
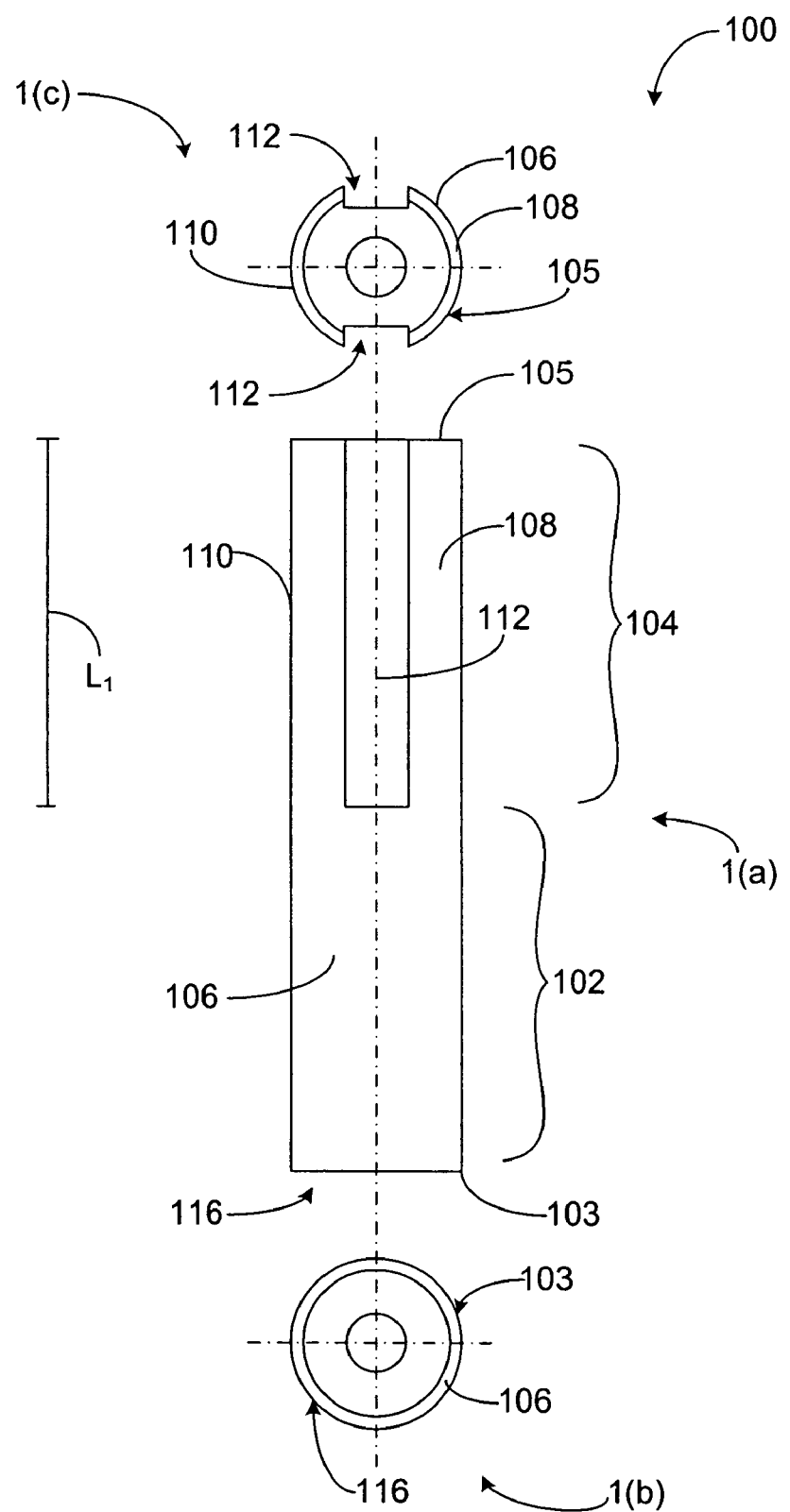
FIG. 1 is a view of an exemplary electrochemical machining (ECM) electrode.

FIG. 1 is a view of an exemplary electrochemical machining (ECM) electrode 100. Specifically, FIG. 1 illustrates a side view 1(*a*) of an hollow ECM electrode 100 having a first section 102 extending from a first end 103 of electrode 100 and a second section 104 extending from a second end 105 of electrode 100, an end view 1(*b*) of first end 103, and an end view 1(*c*) of second end 105. In the exemplary embodiment, electrode 100 is substantially cylindrical and is configured to carry electrolyte fluid therethrough. The electrolyte fluid serves as a medium for electrochemical dissolution to remove metal from a part being machined. The electrolyte fluid also removes dissolved metal from machining zones. As will be appreciated by one skilled in the art, electrode 100 may have any suitable shape based on the intended function thereof. Further, in the exemplary embodiment, electrode 100 includes insulation 106 extending around electrode 100. Insulation 106 confines metal dissolution to desired areas so that a desired cooling hole size and shape can be obtained.

In the exemplary embodiment, insulation 106 circumscribes first section 102, and extends only partially around second section 104. More specifically, in the exemplary embodiment, insulation 106 extends only across a first side 108 and an opposite second side 110 of second section 104. As such, second section 104 includes two portions 112 that are positioned opposite one another and that remain uninsulated or exposed. In an alternative embodiment, insulation 106 and uninsulated portions 112 are oriented in any orientation on second section 104 that enables electrode 100 to function as described herein. Moreover, in the exemplary embodiment, uninsulated portions 112 extend for a length $L_1$ along electrode 100. It should be appreciated by one skilled in the art that uninsulated portions 112 may extend any length $L_1$ along electrode 100 that enables electrode 100 to function as described herein. Specifically, as will be appreciated by one skilled in the art, the configuration, number, size, and length of uninsulated portions 112 are variably selected based on the intended function of electrode 100, and/or an intended result of operating electrode 100.

During operation, an electric current is induced through the electrolyte fluid across electrode 100 and the part that is being machined by electrode 100. Insulation 106 causes the electric current to be discharged from uninsulated portions 112 and an uninsulated tip 116 of electrode 100. Because the configuration, number, size, and length of uninsulated portions 112 are variably selected, the configuration, number, size, and length of uninsulated portions 112 may be varied to vary the amount electric current discharged from tip 116 and uninsulated portions 112.

Figure 2:
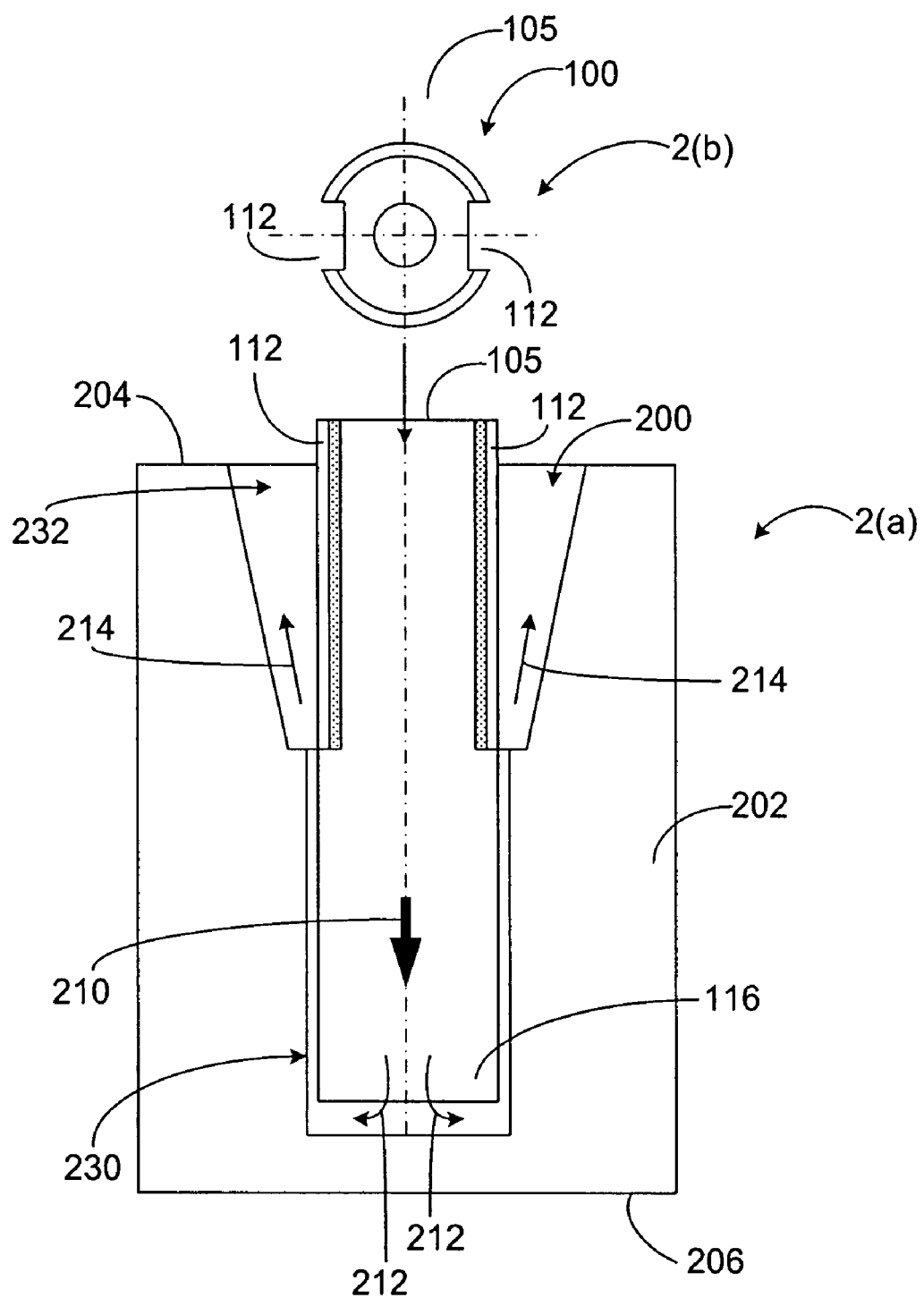
FIG. 2 is a view of the electrode shown in FIG. 1 and being used to form a cooling hole in a turbine airfoil.
Figure 3:
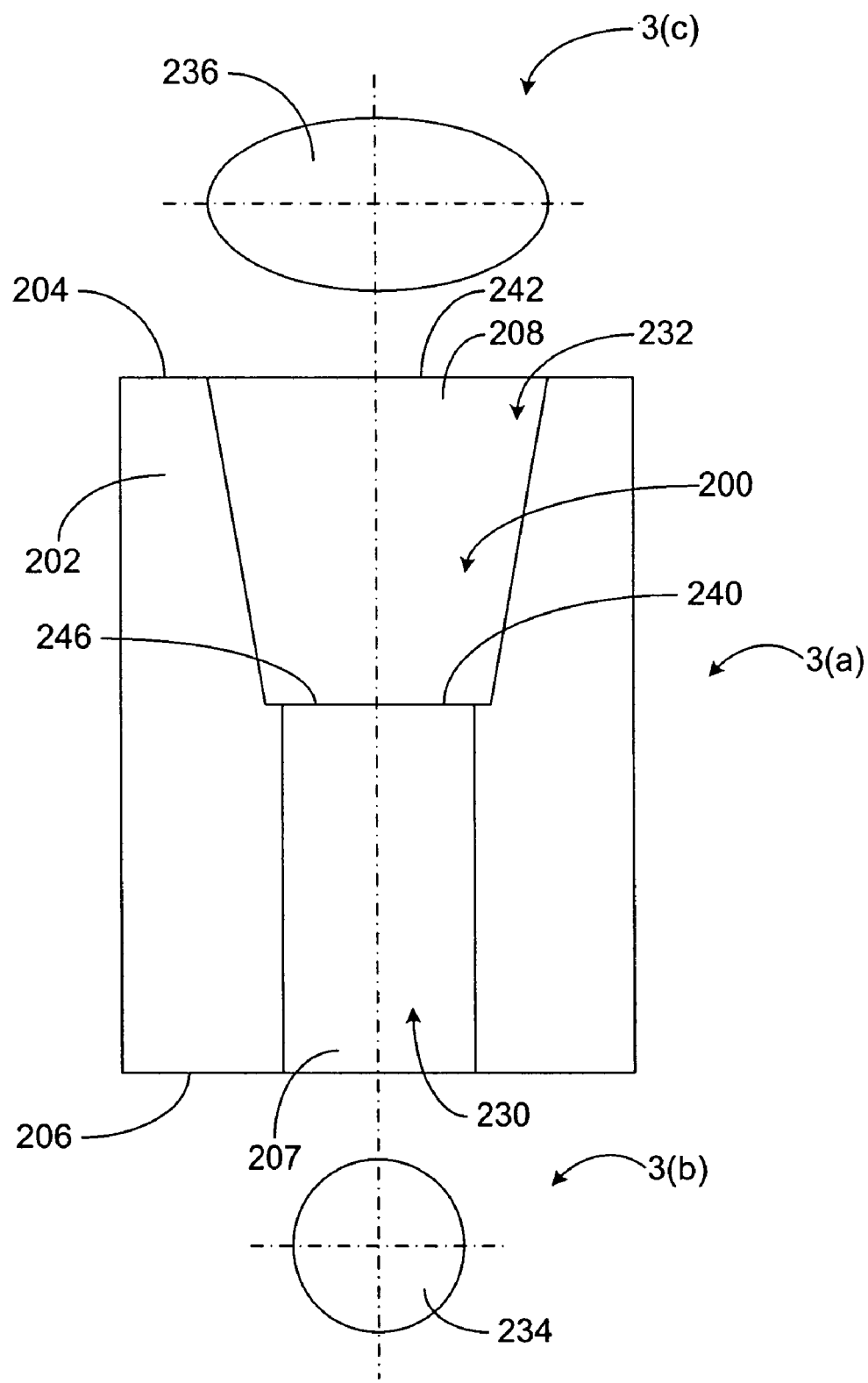
FIG. 3 is a cross-sectional view of the airfoil shown in FIG. 2 and including the cooling hole formed therethrough.

FIG. 2 illustrates electrode 100 being used to form a cooling hole 200 in an exemplary turbine airfoil 202. Specifically, FIG. 2 illustrates a side view 2(a) of electrode 100 being inserted through an external surface 204 of airfoil 202 towards an inner surface 206 of airfoil 202, and an end view 2(b) of the orientation of electrode second end 105 during the machining process. FIG. 3 illustrates a view of airfoil 202 after the machining process is complete, and cooling hole 200 has been formed therein. Specifically, FIG. 3 illustrates a side view 3(a) of airfoil 202 including cooling hole 200, a cross-sectional view 3(b) of a cooling hole inlet 207, and a cross-sectional view 3(c) of a cooling hole exit 208.

During the machining process, electrode first section 102 is inserted through external surface 204 and is directed towards internal surface 206, as shown with arrow 210. In the exemplary embodiment, electrode 100 may be inserted at various angles with respect to external surface 204 including, but not limited to 0°, 90°, and any oblique angle between 0° and 90°. A portion 212 of current is generated between airfoil 202 and electrode tip 116 and a portion 214 of current is generated between uninsulated portions 112 and airfoil 202. As first section 102 is translated through airfoil 202, electric current 212 facilitates removing metal from airfoil 202 to begin forming cooling hole 200. More specifically, the insertion of first section 102 forms a substantially circular cross-sectional area in airfoil 202. In the exemplary embodiment, the metal is removed to form cooling hole 200 because of the electrochemical dissolution. As will be appreciated by one skilled in the art, in an alternative embodiment, electrode 100 can be formed with a shape that will cause a non-circular cross-sectional area to be defined in airfoil 202 by first section 102.

As electrode second section 104 is inserted through airfoil 202, electric current 214 discharged from electrode 100 continues to facilitate removing metal from airfoil 202 and, more specifically, from the substantially circular cross-sectional area formed by first section 102. The additional metal removal causes an elliptical cross-sectional area to be formed within airfoil 202. More specifically, the elliptical cross-sectional area is defined via current 214 being discharged through uninsulated portions 112. As will be appreciated by one skilled in the art, altering the orientation of uninsulated portions 112 can alter the shape of the cross-sectional area defined by second section 104. As electrode second section 104 is inserted through airfoil 202, a larger cross-sectional area is defined within those portions of airfoil 202 that are exposed to current 214 discharged from second section 104. As a result, in the exemplary embodiment, the cross-sectional area of cooling hole 200 defined at external surface 204 is larger than the cross-sectional area of cooling hole 200 defined within portions of airfoil 202 that are exposed only to current 212 discharged from tip 116.

In the exemplary embodiment, when electrode 100 is inserted through airfoil 202, a cooling hole 200 is formed in airfoil 202 that includes a first portion 230 and a second portion 232 that extends from first portion 230. Specifically, first portion 230, having only been exposed to electric current 212 discharged from first section 102, has a substantially circular cross-sectional area 234, and second portion 232, having been exposed to electric current 212 and 214 discharged from uninsulated portions 112 and tip 116, respectively, has a substantially elliptical cross-sectional area 236. In the exemplary embodiment, second portion 232 includes a radially inner end 240 defined adjacent first portion 230, and a radially outer end 242 defined at external surface 204. Because radially outer end 242 is exposed to greater amounts of electric current 214, the cross-sectional area 236 of radially outer end 242 is larger than a cross-sectional area 246 of radially inner end 240. In the exemplary embodiment, second portion 232 tapers from radially outer end 242 to radially inner end 240. As such, cooling hole 200 does not include an abrupt change in cross-sectional area, as is present in the known prior art.

Accordingly, the electrode 100 facilitates forming a cooling hole 200 having differing cross-sectional areas 234 and 236 with a single pass of electrode 100. In the exemplary embodiment, cross-sectional areas 234 and 236 may have at least one of a smooth, rough, and/or corrugated surface finish. As such, first portion 230 of cooling hole 200 facilitates metering the amount of airflow through cooling hole 200. Moreover, second portion 232 of cooling hole 200 facilitates increasing an amount of heat transfer inside airfoil 202 and/or downstream of cooling hole 200, thereby increasing an amount of cooling within airfoil 202. Moreover, the orientation and cross-sectional shape of cooling hole second portion 232 facilitates reducing stress concentrations that may be induced on areas of the airfoil external surface defining cooling hole 200 even in airfoils having a narrow external surface. In addition, the tapered configuration of cooling hole second portion 232 enables gradual expansion of cooling hole 200, such that cooling air channeled therethrough is substantially undisturbed and uniform through cooling hole 200.

In one embodiment, a method for forming cooling holes in an object includes providing an electrochemical machining (ECM) electrode including a first section having insulation that circumscribes the first section, and a second section having insulation extends only partially around the second section. The method also includes inserting the electrode into the object, such that in a single pass the electrode forms a cooling hole that includes a first portion having a first cross-sectional area and a second portion having a second cross-sectional area. In the exemplary embodiment the method also includes forming the cooling hole first portion with a substantially circular cross-sectional area and forming the cooling hole second portion with a non-circular cross-sectional area. In the exemplary embodiment, the method also includes forming an inlet of the cooling hole in a first side of the object and forming an outlet of the cooling hole in an opposite second side of the object. In the exemplary embodiment, the method also includes forming the second portion of the cooling hole with a first end that has a first cross-sectional area and a second end that has a second cross-sectional area that is larger than the first cross-sectional area. In the exemplary embodiment, the method also includes forming the cooling hole such that the cooling hole second portion expands gradually from the cooling hole first portion to an outlet defined on an outer surface of the object. In the exemplary embodiment, the method also includes inserting the electrode into a turbine engine airfoil.

The above-described systems and methods provide an electrode configured to form a cooling hole having differing cross-sectional areas with only a single pass of the electrode through an airfoil. Further, the above-described systems and methods form a cooling hole that meters an amount of air entering the cooling hole and also facilitates greater heat transfer inside the airfoil and/or downstream of the cooling hole. The cooling hole also facilitates reducing stress concentrations that may be induced on areas of airfoil defining the cooling hole even in airfoils having narrow trailing edge. In addition, the cooling hole includes a tapered configuration that enables cooling air to be substantially uniformly channeled therethrough.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for forming cooling holes in an airfoil are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for forming holes in an object, said method comprising:
   providing an electrochemical machining (ECM) electrode including a first section having insulation that circumscribes the first section, and a second section having insulation that extends only partially around the second section; and
   inserting the electrode into the object, such that in a single pass the electrode forms a hole that includes a first portion having a first cross-sectional area and a second portion having a first end, a second end, and a second cross-sectional area defined between the first and second ends, wherein the second portion is tapered from the second end towards the first end.

2. A method in accordance with claim 1 wherein inserting the electrode into the object further comprises forming the hole first portion with a substantially circular cross-sectional area.

3. A method in accordance with claim 1 wherein inserting the electrode into the object further comprises forming the hole second portion with a non-circular cross-sectional area.

4. A method in accordance with claim 1 wherein inserting the electrode into the object further comprises forming an inlet to the hole in a first side of the object and forming an outlet to the hole in an opposite second side of the object.

5. A method in accordance with claim 1 wherein inserting the electrode into the object further comprises forming the second portion of the hole with the first end having a first cross-sectional area and the second end having a second cross-sectional area that is larger than the first cross-sectional area.

6. A method in accordance with claim 1 wherein inserting the electrode into the object further comprises forming the hole such that the hole second portion expands gradually from the hole first portion to an outlet defined on an outer surface of the object.

7. A method in accordance with claim 1 further comprising inserting the electrode into a turbine engine component to form a cooling hole.

8. An electrochemical machining (ECM) electrode comprising:
   a first section comprising insulation circumscribing said first section; and
   a second section comprising insulation extending only partially around said second section, said electrode configured to form a hole in a single pass through an object, wherein the hole comprises a first portion having a first cross-sectional area and a second portion having a first end, a second end, and a second cross-sectional area defined between said first and second ends, wherein said second portion is tapered from said second end towards said first end.

9. An ECM electrode in accordance with claim 8 wherein said electrode first section is configured to form said hole first portion with a substantially circular cross-sectional area.

10. An ECM electrode in accordance with claim 8 wherein said electrode second section is configured to form said hole second portion with a non-circular cross-sectional area.

11. An ECM electrode in accordance with claim 8 wherein said electrode is configured to form an inlet of said hole in a first side of the object and an outlet of said hole in a second side of the object that is opposite the first side of the object.

12. An ECM electrode in accordance with claim 8 wherein said electrode second section is configured to form said hole second portion with said first end having a first cross-sectional area and said second end having a second cross-sectional area that is larger than the first cross-sectional area.

13. An ECM electrode in accordance with claim 8 wherein said electrode second section comprises insulation on a first side and a second side that is opposite the first side.

14. An ECM electrode in accordance with claim 8 wherein said electrode is configured to form said hole such that said hole second portion expands gradually from said hole first portion to an outlet defined on an outer surface of the object.

15. A system for machining holes in a turbine engine component, said system comprising an electrochemical machining (ECM) electrode comprising:
   a first section comprising insulation circumscribing said first section; and a second section comprising insulation extending only partially around said second section, said electrode configured to form a hole in a single pass through the component, wherein the hole comprises a first portion having a first cross-sectional area and a second portion having a first end, a second end, and a second cross-sectional area defined between said first and second ends, wherein said second portion is tapered from said second end towards said first end.

16. A system in accordance with claim 15 wherein said electrode first section is configured to form said hole first portion with a substantially circular cross-sectional area.

17. A system in accordance with claim 15 wherein said electrode second section is configured to form said hole second portion with a non-circular cross-sectional area.

18. A system in accordance with claim 15 wherein said electrode is configured to form an inlet of said hole in an inner surface of the component and an outlet of said hole in an external surface of the component.

19. A system in accordance with claim 15 wherein said electrode second section is configured to form said hole second portion with said first end having a first cross-sectional area and said second end having a second cross-sectional area that is larger than the first cross-sectional area.

20. A system in accordance with claim 15 wherein said electrode is configured to form said hole such that said hole second portion expands gradually from said hole first portion to an outlet defined on an external surface of the component.

* * * * *